(No Model.)
M. BLAIR.
HOLDER FOR GRIDDLE GREASERS.
No. 515,277. Patented Feb. 20, 1894.
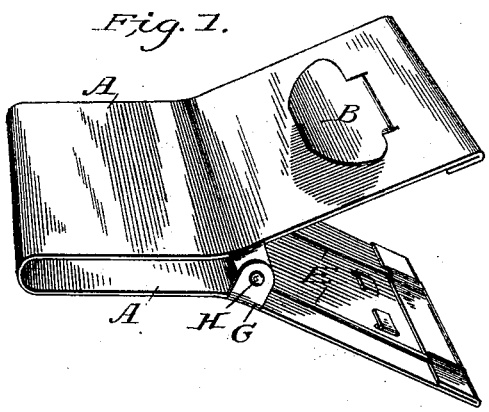
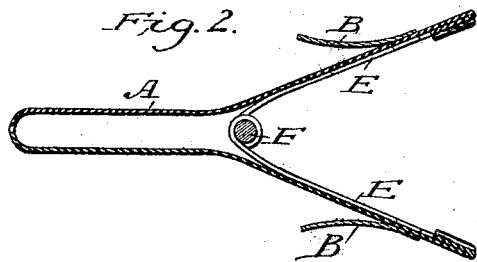
Witnesses.
J H Robb
Maggie A Robb
Inventor.
Maud Blair

UNITED STATES PATENT OFFICE.

MAUD BLAIR, OF SANDY LAKE, PENNSYLVANIA.

HOLDER FOR GRIDDLE-GREASERS.

SPECIFICATION forming part of Letters Patent No. 515,277, dated February 20, 1894.

Application filed September 6, 1893. Serial No. 484,949. (No model.)

*To all whom it may concern:*

Be it known that I, MAUD BLAIR, of Sandy Lake, in the county of Mercer and State of Pennsylvania, have invented an Improvement for Holding Greasers for Greasing Griddles, Pans, or Cooking Utensils; and I do declare that the following is a full and exact description thereof.

Figure 1 is a plain view of the device, embodying my invention and Fig. 2 is a central longitudinal section thereof.

There are two pieces of tin of equal size which can be known as A, A. On the bottom of each piece are teeth cut to join when in place. Then there is a finger rest which is securely fastened to each piece A, A, half way between the center piece, G, and top by two small holes in each side piece A, A, and a slip of each end of finger rest, B, put through the holes and clinched on the inside, the rests being oval. There are two wire springs each having three coils, E, a wooden roller, F, which passes through the coils of each spring the center pieces, G, having small holes in are bent on end of wooden roller, F, and fastened by driving small wire nails through tin into each end of roller, F, the springs being in place on wooden roller, F, the four ends of springs are fastened at the top by an over lap of side pieces, A, A', to hold them firm in place, in Fig. 1 the teeth are closed together is the bottom in which the material used for greasing is to be held by pressing the top together where it is to be held by the hand, opens the teeth and can pick up greasing material, and to use the same for all kinds of baking without soiling the hands.

The object in this improvement of said holder specified is to save trouble, time, burning of fingers and material.

What I claim, and desire to secure by Letters Patent of the United States, is—

The described holder for griddle greaser. A device of the character described, comprising the side pieces, A, A, centrally pivoted to form a clasp, a finger rest, B, attached to each of the side pieces near the handle end and a closing spring sleeved on the pivot bar and having its ends extending beneath the handle end of the side-pieces and inclosed at their extremities by an over lapped portion of said side pieces, as and for the purpose described.

MAUD BLAIR.

Witnesses:
 ISAAC H. ROBB,
 EVA L. ROBB.